Nov. 20, 1951     R. D. ACTON     2,575,507
HYDRAULIC POWER DEVICE
Original Filed July 12, 1947     2 SHEETS—SHEET 1
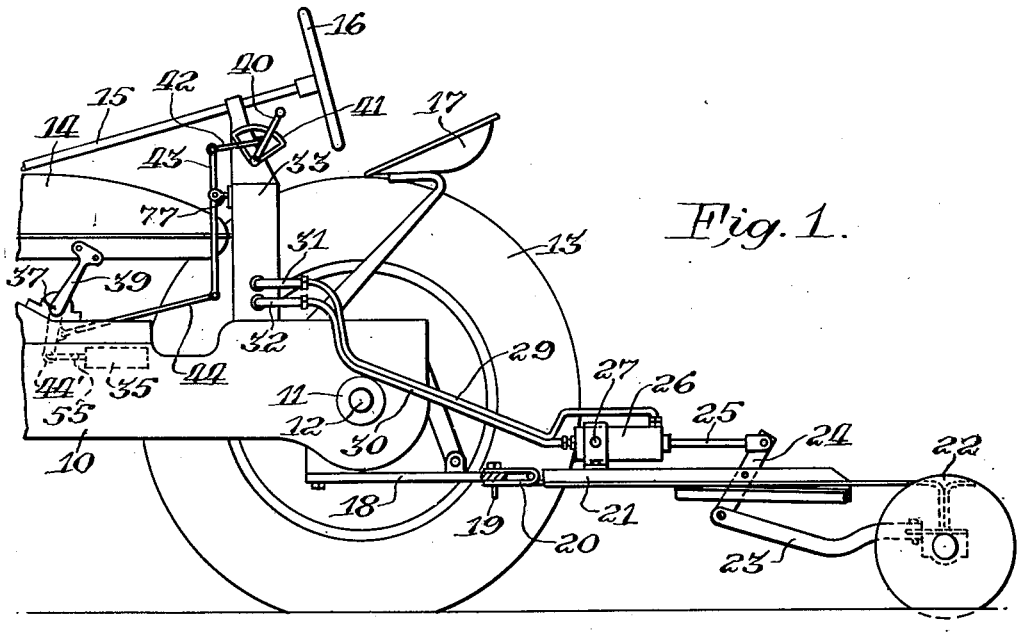
INVENTOR.
Russel D. Acton
BY

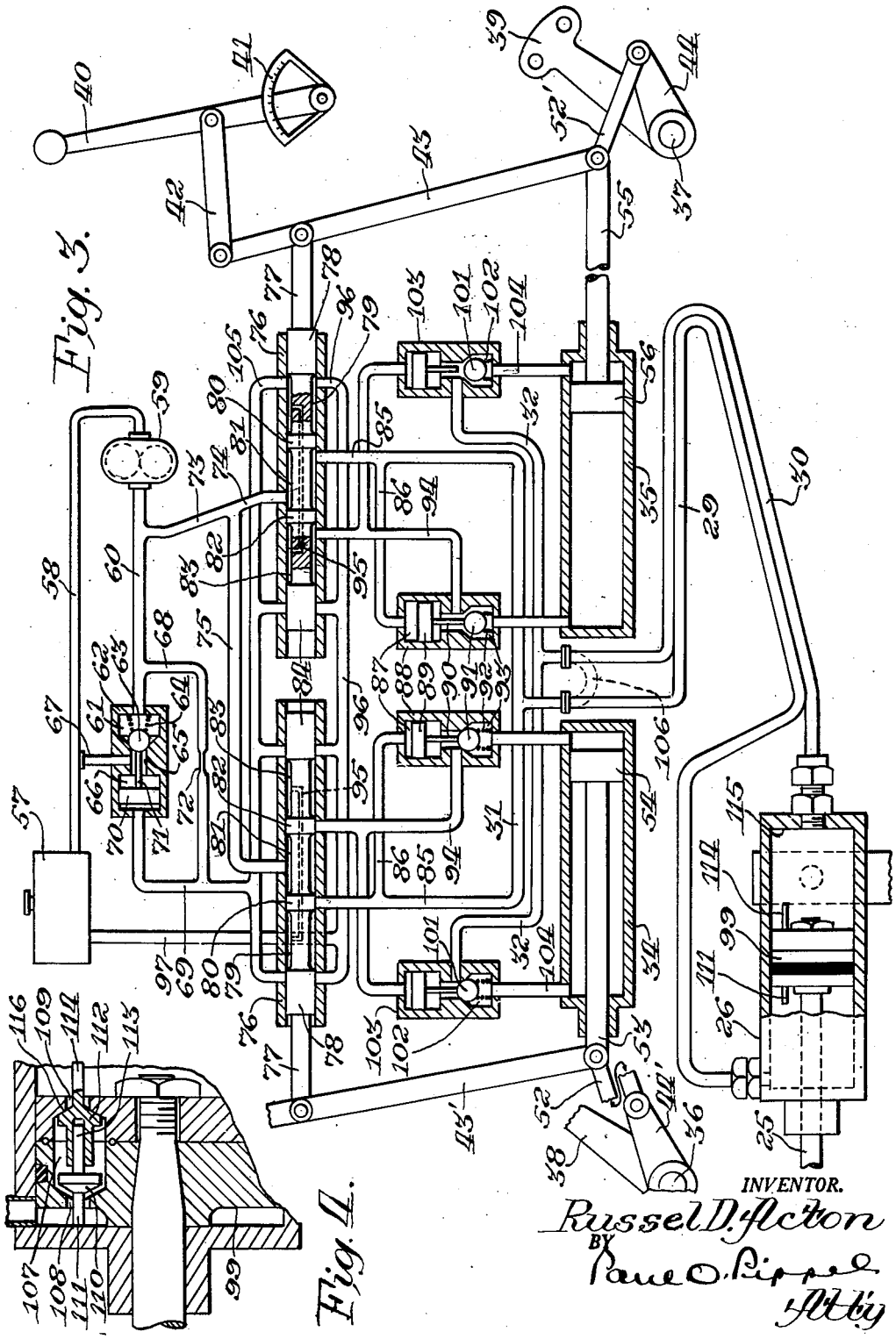

Patented Nov. 20, 1951

2,575,507

UNITED STATES PATENT OFFICE 2,575,507

HYDRAULIC POWER DEVICE

Russel D. Acton, Chicago, Ill.

Continuation of application Serial No. 760,642, July 12, 1947. This application May 13, 1949, Serial No. 93,087

16 Claims. (Cl. 60—52)

This invention relates to a hydraulic power device. This application is a continuation of Ser. No. 760,642, filed July 12, 1947, now abandoned. More specifically, it relates to a hydraulic power-lift particularly adapted for use on tractors with trail-behind implements. In the operation of tractor connected implements, it is particularly desirable to provide lifting mechanism operable from the power-lift plant of the tractor.

During recent years mechanical and hydraulic power-lift systems have been developed which operate rock-shafts on the tractor for lifting and adjusting implements directly mounted on the tractor. There are many types of implements, however, which are connected to the tractor draw-bar for trail-behind operation. Such implements usually have portions or elements requiring adjustment during operation of a machine and also to put the machine into transport position. Various means have been devised which transmit power from the tractor or power-lift device mounted thereon through flexible means to a trail-behind implement.

A principal object of the present invention is to provide a hydraulic device remotely located from a tractor on an implement flexibly connected to the tractor and to provide flexible connections between the remote cylinder and mechanism on the tractor for selectively adjusting parts of the trail-behind implement.

More specifically, an object is to convert hydraulic power devices on the tractor to operate a remote cylinder.

A subsidiary object is to combine a plurality of hydraulic power devices on a tractor so as to selectively operate a single remote cylinder of a capacity equivalent to the sum total of two power-lift devices on the tractor.

The above objects and others, which will be apparent from the detailed description to follow, are accomplished by a construction such as shown in the drawings, in which:

Figure 1 is an elevational view showing the rear portion of an agricultural tractor with a power-lift device installed thereon and a trail-behind disk harrow;

Figure 2 is a plan view showing the tractor and power-lift construction of Figure 1;

Figure 3 is a diagrammatic view showing the entire hydraulic mechanism of the power-lift device incorporated in Figure 1; and Figure 4 is an enlarged section taken through the center of the remote cylinder shown in Figure 3 with the piston in the extreme position at the left end of the cylinder to illustrate the rephasing means.

In Figure 1 the rear portion of a conventional agricultural tractor is shown. Said tractor has a narrow body 10, laterally extending axle housings 11, drive axles 12, as best shown in Figure 2, and rear traction wheels 13, one wheel being removed in Figure 1 to better show the power-lift construction on the tractor and the implement attachment thereto. A fuel tank 14 is illustrated spaced above the body 10. A steering column 15, a steering wheel 16 and an operator's seat 17 are illustrated as parts of the tractor.

A draw-bar 18 is illustrated connected to the tractor and pivotally connected by a pin 19 to a clevis 20 which is a part of a draft frame structure 21 which carries an implement to be adjusted. Such implement may include disks 22 and a member 23 for adjusting the angling of the disks in a conventional manner, not illustrated, as this invention is concerned only with an implement connected to the tractor and provided with a member to be adjusted. The member 23 is shown pivotally connected to a lever 24 which is in turn pivoted intermediate its ends on the draft frame 21. The upper end of the lever 24 is pivotally connected to a piston rod 25 which extends into a cylinder 26 which will be hereinafter described in detail. The cylinder 26 is pivoted at 27 on a bracket 28 secured to the draft frame 21. Flexible conduits 29 and 30 are connected to the cylinder 26 at opposite ends and to Siamesed conduits 31 and 32 connected on opposite sides of a casing 33 which contains the valve structure for actuating the power-lift mechanism. Lifting cylinders 34 and 35, as indicated in dotted lines in Figures 1 and 2, are connected respectively to rock-shafts 36 and 37 extending from opposite sides of the tractors. Said rock-shafts are provided respectively with lifting arms 38 and 39. Duplicate controls for the two cylinders are provided, one being shown in Figure 1 as including a manual control element 40 arranged on a quadrant 41, a link 42, a link 43 and a link 44 extending within the tractor body and connected to an arm 44 on the corresponding rock-shaft 37. It will be understood that a similar control is mounted on the other side to control the other rock-shaft 36, a control element 50 being shown in Figure 2 operating on a quadrant 51. It will be noted that Figures 1 and 2 only show such general elements as appear outside of the enclosed portions of the power-lift device. To clearly show the invention in such a way as to enable it to be readily described and claimed, the diagrammatic views, Figures 3 and 4, have been made. Wherever parts appear in Figure 3, which were visible in Figures 1 and 2, they have been given the same reference characters; for example, the Siamese conduits 31 and 32, the remote cylinder 26, and the lifting arms 38 and 39.

As shown in Figure 3, the rock-shaft 36 has a lever arm 44' which is connected by a link 52 with a piston rod 53. The piston rod 53 is connected to a piston 54 which operates in the cylinder 34 previously referred to and shown in dotted lines in Figure 2.

The lever arm 44 is connected by a link 52' with a piston rod 55. Said rod is connected to a piston 56 which operates in the cylinder 35. A link 43' identical with and having the same function as the link 43 is shown as being broken off in Figure 3, said link, however, being connected to the control element 50 in the same manner that the link 43 is connected to control lever 40.

A fluid pressure supply system and a regulating means therefor is illustrated at the top of Figure 3. A reservoir 57 is connected by a supply conduit 58 to a pump 59 adapted to be driven from the power plant of the tractor. A pump is connected by a conduit 60 with a valve compartment 61 of a valve casing 62. A ball valve 63 in said compartment is normally seated by a compression spring 64 to close off a bore 65 leading to a piston compartment 66. Said bore is also connected with a conduit 67 leading back to the supply conduit 58. A conduit 68 connects the conduit 60 with a conduit 69 leading to the piston compartment 66. A piston 70 slidably mounted in said compartment carries a stem 71 adapted to engage and unseat the ball valve 63 for by-pass of fluid from the pump 59 back to the low pressure side of the system whenever the piston 70 is acted upon by fluid under pressure in the conduit 69. A restriction or bleed passage 72 is formed in the conduit 68.

A supply conduit 73 connects with the conduit 60 and through branch conduits 74 and 75 with cylindrical valve casings 76. Said valve casings are identical and corresponding parts will be identified with the same reference characters to avoid confusion and to avoid the use of excessive number of reference characters. Piston valves 77, one connected to the link 43 and the other to the link 43' are slidable in the casings 76 to provide the desired control of the various ports formed in the valve casing. The valve structure with all its controls of the unit on the right-hand side will be described in detail, it being understood that the same reference characters apply to corresponding parts of the valve structure shown at the left of the drawing.

The piston valves 77 are provided with a cylindrical portion 78, a recessed channel 79, a cylindrical portion 80, a recessed channel 81, a cylindrical portion 82, a recessed channel 83 and a cylindrical portion 84. With the valve on the right side of the drawing in the position illustrated, the intermediate recess 81 is in communication with the supply conduit 74 and with a conduit 85 connected with one end of the manifold 31. The corresponding valve structure on the left has an identical outlet conduit 85 communicating with the other end of the manifold 31. A branch conduit 86 leading off from the conduit 85 communicates with a piston chamber 87 formed in a valve casing 88. The fluid in said chamber is adapted to act against a piston 89 provided with a stem 90 adapted to engage and unseat a ball valve 91 moving it against a compression spring 92. The ball valve 91 is in a compartment 93 communicating when the valve is unseated with a conduit 94 leading to the valve casing 76 and communicating with the channel 83 when the valve is in the position as shown on the right-hand side of Figure 3. It will be seen by the cutaway sections of the valve 77 in Figure 3 that a by-pass conduit 95 formed in the valve structure permits liquid to by-pass from the channel 83 to the channel 79 and therefrom through a conduit 96 back to a conduit 97 leading to the reservoir 57 which is the low pressure side of the system.

Continuing to follow the liquid delivered to the manifold 31, it passes through the flexible conduit 29 to one end of the remotely located cylinder 26 acting against a piston 99 in said cylinder, said cylinder being secured to the previously described piston rod 25. As the piston is moved to the right, referring to Figure 3, liquid is forced out of the other end of the cylinder 26 through a flexible conduit 30 leading back to the tractor and connected with the manifold 32. With the valve at the right, as shown in Figure 3, liquid passing through the right end portion of the manifold 32 unseats a ball check valve 101 mounted in a valve 102 formed in a valve casing 103. The fluid then passes through a conduit 104 into one end of the cylinder 35. The piston 56 in said cylinder is moved to the left, referring to Figure 3, thereby rotating the lever arm 39 in an anticlockwise direction, simultaneously moving the lower end of the link 43 to the left. With the control lever 40 set in a fixed position, movement of the lower end of the lever 43 to the left acts to move the valve 77 to its neutral or cut-off position, as illustrated by the position of the valve 77 shown on the left. When the piston 56 has moved sufficiently to bring the valve 77 on the right to its neutral position, communication of the supply conduit 74 with the supply conduit 85 is cut-off by movement of the cylindrical portion 80 over the inlet end of the conduit 85. This stops movement of the remote piston 99 and of the piston 56 which operates one of the rockshafts on the tractor. Simultaneously, the conduit 94 is cut-off thereby preventing any further escape of fluid from the left end of the cylinder 35, whereby said cylinder is hydraulically locked against movement in either direction. Simultaneously, the cylindrical portion 78 of the valve 77 moves over and cuts off communication between a conduit 105 and a conduit 96. The conduit 105 communicates with the conduit 69 of the pressure control valve 63 and the conduit 96 communicates with the low pressure side of the system as previously described. The bleed 72 is so restricted that when the conduit 69 communicates with the low pressure side of the system, the piston 70 moves to the left, permitting the valve 63 to seat whereby pressure is built up in the system for operating the cylinders. When the portions 78 of the valve piston 77 close for the conduit 105, pressure is built up back of the piston 70 through the conduit 69 due to the delivery of fluid through the bleed 72, thereby unseating the valve 63 and permitting the pump to by-pass back to the low pressure side of the system. It will be understood that the valve structure on the left works exactly in the same manner as the above described operation of the valve on the right. Moreover, it will be noted that said valve structures are symmetrical in the respect that, if the valve on the right, for example, is moved to the left of its neutral position, fluid under pressure will be delivered through the conduit 94 by means of the channel 81 and thereby forcing the piston 56 to the right until the valve is brought back to neutral position. When the piston 56 moves to the right, fluid under pressure is delivered to the manifold 32 and through the conduit 30 to the remote cylinder 26 at the right end of the piston 99.

The valve 77 on the left side of Figure 3 can likewise be operated by shifting in either direction to shift the piston 54 in either direction to therefore shift the remote cylinder 99 in either direction.

The principal feature of the present invention is to combine two independent tractor-mounted power-lifts in such a way that their combined effort may be applied to a single remote cylinder. This is particularly significant as with tractor-mounted implements the independent cylinders are relatively small and have a limited lifting power. For remote cylinders usually one cylinder is sufficient but the implements are usually heavier and require a piston of larger capacity. By providing a construction as described, both of the tractor-mounted cylinders may be connected to a remote cylinder, whereby the combined power of said devices may be applied to the remote cylinder. The cylinder may either take the form of a cylinder with the same bore and twice the structure of the tractor-mounted cylinders, or it may have twice the cross-sectional area of bore and the same length of structure. It is particularly significant that the same indexing control is obtained for the remote cylinder as for the the tractor-mounted rock-shafts and that the rock-shafts retain complete independence of operation. When it is not desired to use the remote cylinder, it may merely be placed on the tractor or in any location where movement of the piston therein does not engage any exterior element. Each independent tractor rock-shaft may then be utilized with its independent manual control in the same manner as if the rear cylinder were not attached. Moreover, the remote cylinder may be removed by disconnecting the conduits 29 and 30 without in any way interfering with the operation of the tractor-mounted cylinders, it being necessary merely to connect the two manifolds together with a U-fitting 106, as shown in dotted lines in Figure 3.

It is obvious that if excess leakage occurs past the piston 99 or past either the piston 54 or 56, the system will be put out of phase with the result that, if there is an excess amount of liquid in the secondary circuit which includes the right end of the cylinder 35 at the right side of the piston 56 and the portion of the cylinder 34 at the left of the piston 54, the piston 99 will reach the end of its structure to the right end of the cylinder 26 before the pistons 54 and 56 have completed their structures. To take care of this condition a rephasing valve has been built into the piston, as best illustrated in Figure 4. A valve chamber 107 formed in the piston communicates through a bore 108 with the cylinder at the left of the piston and a bore 109 with the cylinder at the right of the piston. A valve member 110 is provided with a stem 111 extending through the bore 108. A second valve member 112 slidably having a cylindrical portion slidably mounted on a stem 113 of the valve member 110 has a stem portion 114 extending through the bore 109. When the piston 99 reaches the extreme right end of the cylinder 26, the stem 114 engages the interior wall 115 of the cylinder moving the valve member 112 out of its sealing position with respect to a seat 116 formed around the bore 109. Fluid under pressure then unseats the valve member 110 and escapes to the other side of the piston so long as fluid is supplied to the left end of the cylinder 26. As soon as pressure is released, the piston may tend to move in the left-hand direction, if there is any load acting in that direction on the piston rod 25. However, as soon as the piston moves a sufficient distance to disengage valve stem 114 with the wall 115, movement of the piston is resisted and the system is again in perfect phase. This rephasing takes place automatically whenever the piston 99 reaches the end of its structure in either direction.

It will be understood that applicant has shown and described only a preferred embodiment of his invention and that the hydraulic circuits and the elements constituting the invention have been shown diagrammatically to facilitate the disclosure. It is intended, however, that the attached claims cover any working embodiment of the hydraulic system disclosed which fall within their scope.

What is claimed is:

1. A power control device for tractor connected implements comprising in combination with a tractor and an implement connected thereto, said implement having a part to be adjusted, a fluid pump adapted to be driven from the power plant of the tractor, two independently operable tractor mounted piston and cylinder devices, two independent valve structures connected to the pump and providing means for delivering fluid under pressure to one end of each of the cylinder and piston devices, a remote cylinder having a fluid capacity equivalent to both of the tractor mounted cylinders, means for connecting the other ends of both cylinders to a single conduit for supplying fluid communication with said remote cylinder, said conduit being connected to one end of said remote cylinder, a conduit connected to the other end of the remote cylinder, said conduit being connected with both of said valve structures, said conduits being so arranged and constructed that fluid from either or both of the tractor mounted cylinders during discharge therefrom is transmitted to the remote cylinder, and fluid being discharged from the remote cylinder is delivered back through the respective valve structure to the pressure supply pump.

2. A power control device for tractor connected implements comprising in combination with a tractor and an implement connected thereto, said implement having a part to be adjusted, a fluid pump adapted to be driven from the power plant of the tractor, two independently operable tractor mounted piston and cylinder devices, two independently operable rock shafts mounted on the tractor, the pistons of said device being connected respectively to said rock shafts for adjusting the same in either of two directions, two independently operable valve structures connected to the pump and providing means for delivering fluid under pressure to one end of each of the cylinder and piston devices, a remote cylinder having a fluid capacity equivalent to both of the tractor mounted cylinders, means for connecting the other ends of both cylinders to a single conduit for supplying fluid communication with said remote cylinder, said conduit being connected to one end of said remote cylinder, a conduit connected to the other end of the remote cylinder, said conduit being connected with both of said valve structures, said conduits being so arranged and constructed that fluid from either or both of the tractor mounted cylinders during discharge therefrom is transmitted to the remote cylinder, and fluid being discharged from the remote cylinder is delivered back through the respective valve structure to the pressure supply pump.

3. A power control device for a tractor having an implement connected thereto, said implement having a part to be adjusted, a fluid pump adapted to be driven from the power plant of the tractor, two independently operable tractor mounted piston and cylinder devices, two independent valve structures connected to the pump and providing means for delivering fluid under pressure to one end of each of the cylinder and piston devices comprising, a remote cylinder having a fluid capacity equivalent to both of the tractor mounted cylinders, means for connecting the other ends of both tractor mounted cylinders to a single conduit for supplying fluid communication with said remote cylinder, said conduit being connected to one end of said remote cylinder, a conduit connected to the other end of the remote cylinder, said conduit being connected with both of said valve structures, said conduits being so arranged and constructed that fluid from either or both of the tractor mounted cylinders during discharge therefrom is transmitted to the remote cylinder, and fluid being discharged from the remote cylinder is delivered back through the respective valve structure to the pressure supply pump.

4. A power control device for a tractor having an implement connected thereto, said implement having a part to be adjusted, a fluid pump adapted to be driven from the power plant of the tractor, two independently operable tractor mounted piston and cylinder devices, two independently operable rock shafts mounted on the tractor, the pistons of said device being connected respectively to said rock shafts for adjusting the same in either of two directions, two independent valve structures connected to the pump and providing means for delivering fluid under pressure to one end of each of the cylinder and piston devices comprising, a remote cylinder having a fluid capacity equivalent to both of the tractor mounted cylinders, means for connecting the other ends of both tractor mounted cylinders to a single conduit for supplying fluid communication with said remote cylinder, said conduit being connected to one end of said remote cylinder, a conduit connected to the other end of the remote cylinder, said conduit being connected with both of said valve structures, said conduits being so arranged and constructed that fluid from either or both of the tractor mounted cylinders during discharge therefrom is transmitted to the remote cylinder, and fluid being discharged from the remote cylinder is delivered back through the respective valve structure to the pressure supply pump.

5. A power control device comprising in combination with a part to be adjusted, a fluid pump, two independently operable piston and cylinder devices, two independently operable work members, the pistons of said device being connected respectively to said work members for adjusting the same in either of two directions, two independent valve structures connected to the pump and providing means for delivering fluid under pressure to one end of each of the cylinder and piston devices, a remote cylinder having a fluid capacity equivalent to both of the cylinders of the two piston and cylinder devices, means for connecting the other ends of both cylinders to a single conduit for supplying fluid communication with said remote cylinder, said conduit being connected to one end of said remote cylinder, a conduit connected to the other end of the remote cylinder, said conduit being connected with both of said valve structures, said conduits being so arranged and constructed that fluid from either or both of the tractor mounted cylinders during discharge therefrom is transmitted to the remote cylinder, and fluid being discharged from the remote cylinder is delivered back through the respective valve structure to the fluid pump.

6. A power control device for tractor connected implements comprising in combination with a tractor and an implement connected thereto, said implement having a part to be adjusted, a fluid reservoir, a fluid pump adapted to be driven from the power plant of the tractor, two independently operable tractor mounted piston and cylinder devices, a remote cylinder having a fluid capacity equivalent to both of the tractor mounted cylinders, means for connecting corresponding ends of both cylinders to a conduit for supplying said remote cylinder, a conduit connected to the one end of the remote cylinder, said conduit being connected to corresponding ends of both of the tractor mounted cylinders, two independent valve structures adapted to receive fluid under pressure from the pump, each valve structure including a valve element movable from a neutral position into a position for delivering fluid to one end of one of the tractor mounted cylinders and means for delivering displaced fluid from the remote cylinder to the reservoir, manual means to move said valve element to a selected position and linkage connected to the corresponding piston to return the valve to a neutral position after movement of the piston to the selected position.

7. A power control device for tractor connected implements comprising in combination with a tractor and an implement connected thereto, said implement having a part to be adjusted, a fluid reservoir, a fluid pump adapted to be driven from the power plant of the tractor, two independently operable tractor mounted piston and cylinder devices, two independently operable rock shafts mounted on the tractor, the pistons of said device being connected respectively to said rock shafts for adjusting the same in either of two directions, a remote cylinder having a fluid capacity equivalent to both of the tractor mounted cylinders, means for connecting corresponding ends of both cylinders to a conduit for supplying said remote cylinder, a conduit connected to the one end of the remote cylinder, said conduit being connected to corresponding ends of both of the tractor mounted cylinders, two independent valve structures adapted to receive fluid under pressure from the pump, each valve structure including a valve element movable from a neutral position into a position for delivering fluid to one end of one of the tractor mounted cylinders and means for delivering displaced fluid from the remote cylinder to the reservoir, manual means to move said valve element to a selected position and linkage connected to the corresponding piston to return the valve to a neutral position after movement of the piston to the selected position.

8. A power control device for a tractor having an implement connected thereto, said implement having a part to be adjusted, a fluid reservoir, a fluid pump adapted to be driven from the power plant of the tractor, two independently operable tractor mounted piston and cylinder devices, comprising a remote cylinder having a fluid capacity equivalent to both of the tractor mounted cylinders, means for connecting corresponding ends of both tractor mounted cylinders to a conduit for supplying said remote cylinder, a conduit connected to the one end of the remote cylinder, said conduit being connected to corresponding ends of both of the tractor mounted cylinders, two independent valve structures adapted to receive fluid under pressure from the pump, each valve structure including a valve element movable from a neutral position into a position for delivering fluid to one end of one of the tractor mounted cylinders and means for delivering displaced fluid from the remote cylinder to the reservoir, manual means to move said valve element to a selected position and linkage connected to the corresponding piston to return the valve to a neutral position after movement of the piston to the selected position.

9. A power control device for a tractor having an implement connected thereto, said implement having a part to be adjusted, a fluid reservoir, a fluid pump adapted to be driven from the power plant of the tractor, two independently operable tractor mounted piston and cylinder devices, two independently operable rock shafts mounted on the tractor, the pistons of said device being connected respectively to said rock shafts for adjusting the same in either of two directions, comprising a remote cylinder having a fluid capacity equivalent to both of the tractor mounted cylinders, means for connecting corresponding ends of both tractor mounted cylinders to a conduit for supplying said remote cylinder, a conduit connected to the one end of the remote cylinder, said conduit being connected to corresponding ends of both of the tractor mounted cylinders, two independent valve structures adapted to receive fluid under pressure from the pump, each valve structure including a valve element movable from a neutral position into a position for delivering fluid to one end of one of the tractor mounted cylinders and means for delivering displaced fluid from the remote cylinder to the reservoir, manual means to move said element to a selected position and linkage connected to the corresponding piston to return the valve to a neutral position after movement of the piston to the selected position.

10. A power control device comprising in combination with a part to be adjusted, a fluid reservoir, a fluid pump, two independently operable piston and cylinder devices, two independently operable work members, the pistons of said device being connected respectively to said work members for adjusting the same in either of two directions, a remote cylinder having a fluid capacity equivalent to both of the cylinders of the two piston and cylinder devices, means for connecting corresponding ends of both cylinders to a conduit for supplying said remote cylinder, a conduit connected to the one end of the remote cylinder, said conduit being connected to corresponding ends of both of the tractor mounted cylinders, two independent valve structures adapted to receive fluid under pressure from the pump, each valve structure including a valve element movable from a neutral position into a position for delivering fluid to one end of one of the tractor mounted cylinders and means for delivering displaced fluid from the remote cylinder to the reservoir, manual means to move said valve element to a selected position and linkage connected to the corresponding piston to return the valve to a neutral position after movement of the piston to the selected position.

11. A power control device for tractor connected implements comprising in combination with a tractor and an implement connected thereto, said implement having a part to be adjusted, a fluid pump adapted to be driven from the power plant of the tractor, two independently operable tractor mounted piston and cylinder devices, valve structure connected to the pump and providing means for delivering fluid under pressure to one end of each of the cylinder and piston devices, a remote cylinder having a fluid capacity equivalent to both of the tractor mounted cylinders, and means for connecting the other ends of both cylinders to a single conduit, said conduit being connected to one end of said remote cylinder.

12. A power control device comprising in combination with a part to be adjusted, a fluid pump, two independently operable piston and cylinder devices, two independently operable work members, the pistons of said device being connected respectively to said work members for adjusting the same in either of two directions, valve structure connected to the pump and providing means for delivering fluid under pressure to one end of each of the cylinder and piston devices, a remote cylinder having a fluid capacity equivalent to both of the cylinders of the two piston and cylinder devices, means for connecting the other ends of both cylinders to a single conduit for supplying fluid communication with said remote cylinder, said conduit being connected to one end of said remote cylinder, a conduit connected to the other end of the remote cylinder, said conduit being connected with said valve structure, said conduits being so arranged and constructed that fluid from either or both of the tractor mounted cylinders during discharge therefrom is transmitted to the remote cylinder, and fluid being discharged from the remote cylinder is delivered back through the valve structure to the fluid pump.

13. A power control device for a tractor having an implement connected thereto, said implement having a part to be adjusted, a fluid reservoir, a fluid pump adapted to be driven from the power plant of the tractor, two independently operable tractor mounted piston and cylinder devices, comprising a remote cylinder having a fluid capacity equivalent to both of the tractor mounted cylinders, means for connecting corresponding ends of both tractor mounted cylinders to a conduit for supplying said remote cylinder, a conduit connected to one end of the remote cylinder, said conduit being connected to corresponding ends of both of the tractor mounted cylinders, valve structure adapted to receive fluid under pressure from the pump, said valve structure having flow control means movable from a neutral position into a position for delivering fluid to one end of each of the tractor mounted cylinders and means for delivering displaced fluid from the remote cylinder to the reservoir, and manual means to control said valve means.

14. A power control device comprising in combination with a part to be adjusted, a fluid reservoir, a fluid pump, two independently operable piston and cylinder devices, two independently operable work members, the pistons of said device being connected respectively to said work members for adjusting the same in either of two directions, a remote cylinder having a fluid capacity equivalent to both of the cylinders of the two piston and cylinder devices, means for connecting corresponding ends of both cylinders to a conduit for supplying said remote cylinder, a conduit connected to the one end of the remote cylinder, said conduit being connected to corresponding ends of both of the tractor mounted cylinders, valve structure adapted to receive fluid under pressure from the pump and to deliver fluid to one end of the tractor mounted cylinders and means for delivering displaced fluid from the remote cylinder to the reservoir, manual means to move a portion of said valve structure to a selected position and linkage connected to the corresponding piston to return said portion of the valve to a neutral position after movement of the piston to the selected position.

15. A power control device for tractor connected implements comprising in combination with a tractor and an implement connected thereto, said implement having a part to be adjusted, a fluid pump adapted to be driven from the power plant of the tractor, two independently mounted piston and cylinder devices on the tractor, means for delivering fluid under pressure from the pump to one side of the piston of each of the piston and cylinder devices, a remote cylinder having a fluid capacity equivalent to both of the cylinders of said two devices, and means connecting the other ends of both of said cylinders at their other sides of the pistons to a single conduit, said single conduit communicating with the remote cylinder.

16. A power control device for tractor connected implements comprising in combination with a tractor and an implement connected thereto, said implement having a part to be adjusted, a fluid pump adapted to be driven from the power plant of the tractor, two independent piston and cylinder devices mounted on the tractor, means operable from said pump for actuating said devices, a remote piston and cylinder device having a fluid capacity equivalent to both of the tractor mounted devices, and means for delivering fluid from said tractor mounted devices to said remote piston and cylinder device.

RUSSEL D. ACTON.

REFERENCES CITED

The following references are of record in the file of this patent:

UNITED STATES PATENTS

| Number | Name | Date |
|---|---|---|
| 2,346,857 | Meredith | Apr. 18, 1944 |